(12) United States Patent
Hayman

(10) Patent No.: US 8,904,786 B2
(45) Date of Patent: Dec. 9, 2014

(54) INTERNAL COMBUSTION ENGINE

(75) Inventor: Alan W. Hayman, Romeo, MI (US)

(73) Assignee: GM Global Technology Operations LLC, Detroit, MI (US)

(*) Notice: Subject to any disclaimer, the term of this patent is extended or adjusted under 35 U.S.C. 154(b) by 341 days.

(21) Appl. No.: 13/157,644

(22) Filed: Jun. 10, 2011

(65) Prior Publication Data

US 2012/0260894 A1 Oct. 18, 2012

Related U.S. Application Data

(60) Provisional application No. 61/474,983, filed on Apr. 13, 2011.

(51) Int. Cl.
| | | |
|---|---|---|
| F02B 33/44 | (2006.01) |
| F02M 25/07 | (2006.01) |
| F02B 47/08 | (2006.01) |
| F02B 33/34 | (2006.01) |
| F02M 35/116 | (2006.01) |
| F02B 29/04 | (2006.01) |

(52) U.S. Cl.
CPC ............... F02B 47/08 (2013.01); F02B 33/34 (2013.01); F02M 25/0749 (2013.01); F02M 25/0705 (2013.01); F02M 25/0727 (2013.01); Y02T 10/121 (2013.01); F02M 35/116 (2013.01); F02B 29/0406 (2013.01)
USPC .................... 60/605.2; 701/108; 123/568.11; 123/568.13

(58) Field of Classification Search
CPC ...... F02B 33/44; F02B 47/08; F02B 29/0406; F02M 25/07; F02M 25/0705; F02M 25/0749; F02M 25/0727; F02M 35/116; F02D 41/0065; F02D 41/0082; Y02T 10/121; Y02T 10/144
USPC .......... 60/605.2; 123/568.11–568.13, 568.17, 123/568.21, 3; 701/108
IPC ....................................................... F02M 25/07
See application file for complete search history.

(56) References Cited

U.S. PATENT DOCUMENTS

| | | | | | |
|---|---|---|---|---|---|
| 3,941,113 | A | * | 3/1976 | Baguelin | 123/198 F |
| 4,108,114 | A | * | 8/1978 | Kosaka et al. | 123/3 |
| 4,131,095 | A | * | 12/1978 | Ouchi | 123/3 |

(Continued)

FOREIGN PATENT DOCUMENTS

| | | | | |
|---|---|---|---|---|
| DE | 102011118729 | * | 5/2013 | F02M 25/07 |
| EP | 0838582 A1 | | 4/1998 | |

(Continued)

OTHER PUBLICATIONS

Chinese Office Action for Application No. 201210107827.3 dated Jan. 2, 2014; 8 pages.

Primary Examiner — Thai Ba Trieu
(74) Attorney, Agent, or Firm — Cantor Colburn LLP

(57) ABSTRACT

An internal combustion engine comprises a four stroke working cylinder, a four stroke EGR cylinder, an intake system for supplying a combustion air charge to the cylinders, a first exhaust system for removing exhaust gas from the four stroke working cylinder and to the atmosphere and a second exhaust system for removing exhaust from the four stroke EGR cylinder and to the intake system, wherein the combustion air charge is a combination of combustion air and exhaust gas from the four stroke EGR cylinder.

19 Claims, 4 Drawing Sheets

(56) References Cited

U.S. PATENT DOCUMENTS

| | | | |
|---|---|---|---|
| 4,179,892 A * | 12/1979 | Heydrich | 60/605.2 |
| 5,178,119 A * | 1/1993 | Gale | 123/568.12 |
| 5,517,976 A * | 5/1996 | Bachle et al. | 60/605.2 |
| 5,682,746 A * | 11/1997 | von Hoerner | 60/605.2 |
| 5,894,726 A | 4/1999 | Monnier | 60/274 |
| 6,141,959 A * | 11/2000 | Digeser et al. | 60/274 |
| 6,286,489 B1 * | 9/2001 | Bailey | 123/568.11 |
| 6,425,381 B1 * | 7/2002 | Rammer | 123/568.12 |
| 6,470,864 B2 * | 10/2002 | Kim et al. | 123/568.12 |
| 6,543,230 B1 * | 4/2003 | Schmid | 60/605.2 |
| 6,789,531 B1 * | 9/2004 | Remmels | 60/605.2 |
| 7,721,541 B2 * | 5/2010 | Roberts et al. | 60/605.2 |
| 7,788,923 B2 * | 9/2010 | Rowells | 60/605.2 |
| 7,945,376 B2 * | 5/2011 | Geyer et al. | 701/108 |
| 8,186,334 B2 * | 5/2012 | Ooyama | 60/605.2 |
| 8,191,369 B2 * | 6/2012 | Geyer et al. | 60/605.2 |
| 8,291,891 B2 * | 10/2012 | Alger et al. | 123/568.11 |
| 8,297,053 B2 * | 10/2012 | Gladden et al. | 60/605.2 |
| 2002/0189598 A1 * | 12/2002 | Remmels et al. | 123/568.11 |
| 2006/0112940 A1 * | 6/2006 | Roberts et al. | 123/568.11 |
| 2007/0235011 A1 * | 10/2007 | Easley et al. | 123/568.13 |
| 2010/0037601 A1 * | 2/2010 | Pierpont | 60/323 |
| 2010/0116255 A1 * | 5/2010 | Hatamura | 123/568.11 |
| 2012/0000448 A1 * | 1/2012 | Freund et al. | 123/568.21 |
| 2012/0048244 A1 * | 3/2012 | Hayman et al. | 123/568.11 |
| 2012/0078492 A1 * | 3/2012 | Freund et al. | 701/108 |
| 2012/0204844 A1 * | 8/2012 | Gingrich et al. | 123/568.11 |
| 2012/0204845 A1 * | 8/2012 | Gingrich et al. | 123/568.17 |
| 2013/0199502 A1 * | 8/2013 | Hayman | 123/48 B |
| 2013/0247715 A1 * | 9/2013 | Hayman et al. | 74/596 |

FOREIGN PATENT DOCUMENTS

| | | | | |
|---|---|---|---|---|
| GB | 2473481 A | | 3/2011 | |
| JP | 11247665 A | * | 9/1999 | F02M 25/07 |
| JP | 2007177656 A | * | 7/2007 | F02M 25/07 |
| JP | 2011099385 A | * | 5/2011 | F02M 25/07 |

* cited by examiner

INTERNAL COMBUSTION ENGINE

CROSS-REFERENCES TO RELATED APPLICATIONS

This patent application claims priority to U.S. patent application Ser. No. 61/474,983 filed Apr. 13, 2011 which is hereby incorporated herein by reference in its entirety.

FIELD OF THE INVENTION

Exemplary embodiments of the invention relate to internal combustion engines having exhaust gas recirculation systems and, more particularly, to an internal combustion engine having an engine cylinder dedicated to the production and supply of recirculated exhaust gas to another cylinder of the engine.

BACKGROUND

With increased focus on vehicle economy, automotive manufacturers are turning to smaller, lighter vehicles and unique vehicle powertrains to boost efficiency. Recirculated exhaust gas ("EGR") is utilized in most conventional internal combustion engines to assist in the reduction of throttling losses at low loads, and to improve knock tolerance and reduce the level of oxides of nitrogen ("$NO_x$") in the exhaust gas. EGR is especially important as an emissions reducer in internal combustion engines that run lean of stoichiometry and are, as such, prone to emitting higher levels of $NO_x$ emissions.

One proposition that has been considered in the construction of internal combustion engine systems is to utilize one of a plurality of cylinders as a dedicated EGR source. Specifically, in a four cylinder engine for instance, three of the four cylinders will run at normal air, fuel and EGR mixtures. The exhaust gas produced by these cylinders will exit the internal combustion engine as exhaust gas and be treated in an exhaust gas treatment system prior to its release to the atmosphere. One of the four cylinders is operated at customized levels of air and fuel; as may be determined by an engine controller that is in signal communication with various engine, vehicle and exhaust system sensors. The exhaust gas produced in the single cylinder is transferred to the intake ports of the other three cylinders to provide EGR. Such a configuration allows, for example, richer EGR, which contains higher levels of Hydrogen, thereby improving knock resistance, fuel consumption and combustion stability while still allowing stoichiometrically combusted exhaust gas to be maintained in the exhaust gas treatment system for compatibility with the catalytic treatment devices.

A disadvantage to this type of internal combustion engine system is that a 4 cylinder internal combustion engine that uses only one cylinder as a dedicated EGR cylinder may not deliver uniform volumes or EGR to the working cylinders due to the uneven firing order of the cylinders. For example, the cylinder combustion event following the dedicated EGR cylinder combustion event is prone to receive more EGR diluent than the subsequent two firing cylinders. This variation in cylinder makeup (i.e. combustion air, fuel and EGR diluent) may result in uneven combustion performance that is difficult to control over a broad range of operating conditions.

SUMMARY

In an exemplary embodiment an internal combustion engine comprises a four stroke working cylinder, a four stroke EGR cylinder, an intake system for supplying a combustion air charge to the cylinders, a first exhaust system for removing exhaust gas from the four stroke working cylinder and to the atmosphere and a second exhaust system for removing exhaust from the four stroke EGR cylinder and to the intake system, wherein the combustion air charge is a combination of combustion air and exhaust gas from the four stroke EGR cylinder.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
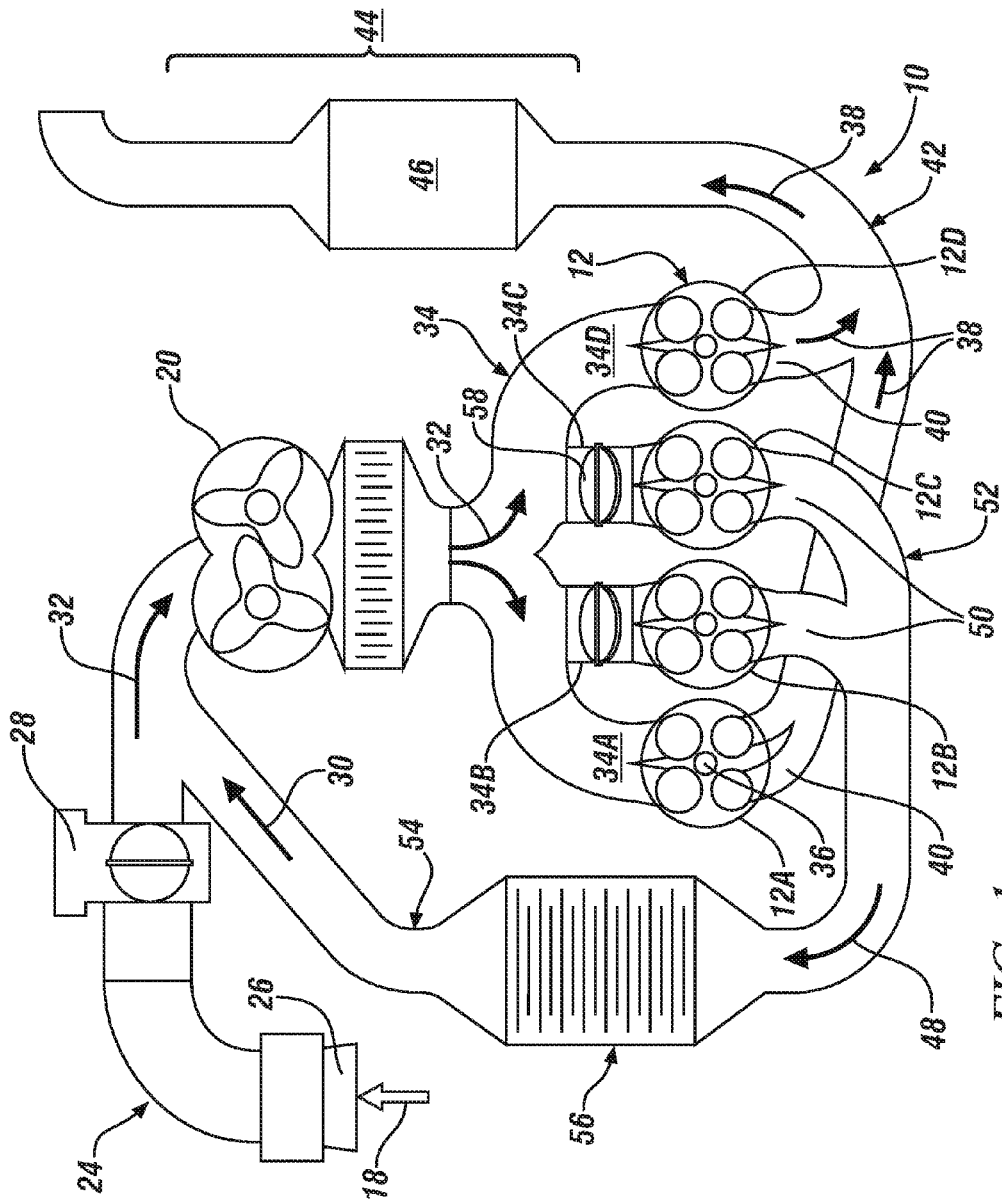
FIG. 1 is a schematic plan view of portions of an internal combustion engine system embodying features of the invention.

The following description is merely exemplary in nature and is not intended to limit the present disclosure, its application or uses. It should be understood that throughout the drawings, corresponding reference numerals indicate like or corresponding parts and features.

The invention described in various embodiments herein comprises a novel apparatus and method for the supply of exhaust gas to the cylinders of an internal combustion engine (i.e. regenerated exhaust gas "EGR"). As discussed above, the EGR is useful in maintaining several performance parameters of the internal combustion engine including maintaining reduced levels of oxides of nitrogen ("$NO_x$") which is a regulated exhaust constituent and is more prevalent in engines that are operated on the lean side (i.e. excess oxygen) of stoichiometry. The basic premise of the invention is to provide an internal combustion engine with two sets of cylinders; a first "working set" and a second "EGR set". While all cylinders are operated in a manner that provide work output from the engine, the first, working set is operated at normal air/fuel ratios that deliver optimum power and appropriate exhaust emissions to an exhaust treatment system. The second, EGR set is operated in a manner that may not necessarily deliver optimum power and appropriate exhaust emissions but, instead delivers optimal EGR directly to the intake ports of the first, working set of cylinders. Mechanically, the exhaust ports of the second, EGR set of cylinders is fluidly connected to the intake system of the internal combustion engine and not to the exhaust treatment system. The flow path for the exhaust from these cylinders to the exhaust treatment system is through the first, working cylinders.

Optimization of the internal combustion engine is achieved through the use of equal numbers of first, working sets of cylinders and second, EGR sets of cylinders. For example, in the case of a two-cylinder internal combustion engine, one cylinder is a working cylinder and the second cylinder is an EGR cylinder. The second, EGR cylinder is calibrated to have a combustion event prior to the combustion event of the working cylinder thereby providing EGR in the engine intake system as the working cylinder is ingesting its air/fuel mixture. The result is a constant, reliable supply of EGR to the working cylinder at the appropriate time for optimal performance of the working cylinder. It is contemplated that the second, EGR cylinder may not be configured with the same volume as the first, working cylinder. Due to the EGR demands of the first, working cylinder, the EGR cylinder may have a smaller or larger volume which may be achieved through an increase or reduction in the diameter of the cylinder or a shorter piston travel achieved through a modified crankshaft and/or crank set. As should be apparent, it is contemplated that the invention has application to many configurations of internal combustion engines without deviating from the scope thereof. For example, a 2-cylinder engine may comprise one working cylinder and one EGR cylinder, a 4-cylinder engine may comprise 2 working cylinders and two EGR cylinders, a 6-cylinder engine may comprise 3 working cylinders and three EGR cylinders an 8-cylinder engine may comprise 4 working cylinders and 4 EGR cylinders, etc.

Referring now to FIG. 1 and for purposes of description only, an exemplary embodiment of the invention is directed to an internal combustion engine system 10 comprising a plurality of engine cylinders 12. In the embodiment illustrated, the internal combustion engine system 10 is an in-line four cylinder internal combustion engine including four engine cylinders 12, however the configuration may also include any number of cylinders (to be described in further detail) as well as other configurations such as V-configured, horizontally opposed and the like, without affecting the application of the invention thereto.

Referring to the engine cylinders 12 in the embodiment shown, all four cylinders 12 are configured to operate on a four-stroke combustion cycle. The individual cylinders are numbered cylinder #1, 12A (working cylinder), cylinder #2, 12B (EGR cylinder), cylinder #3 12C (EGR cylinder), and cylinder #4, 12D (working cylinder). Combustion air 18 enters an intake system 24 through inlet 26 and is metered by a throttle body 28 in a known manner. The metered combustion air 18 is mixed with an exhaust gas diluent referred to generally as recirculated exhaust gas or EGR 30 to form a combustion charge 32 comprising a mixture of combustion air 18 and EGR 30

Figure 4:
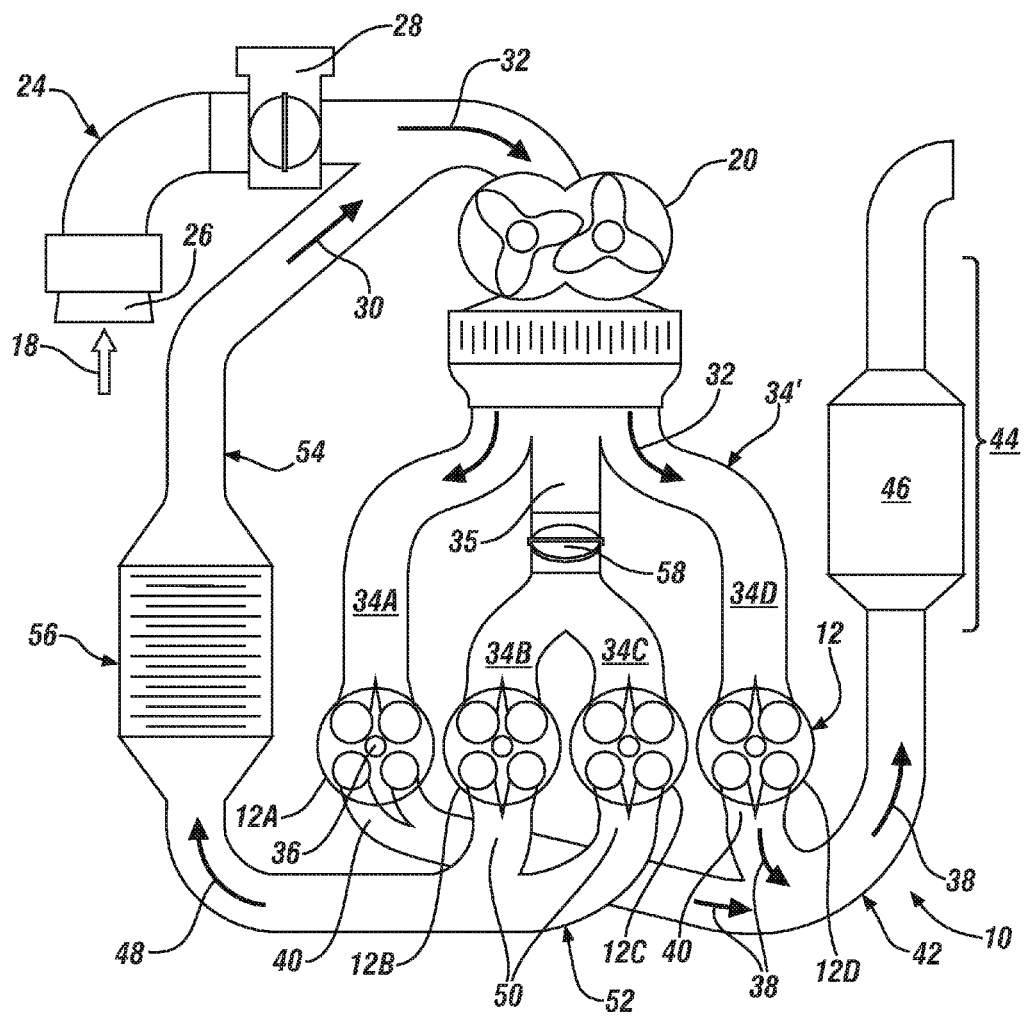
FIG. 4 is a schematic plan view of portions of an internal combustion engine system featuring an alternative embodiment of the invention.

The combustion charge 32 may be compressed by a compressor 20, which in the exemplary embodiment shown is an engine driven supercharger, and is delivered to each of the engine cylinders 12 through an intake manifold 34 comprising a plurality of intake runners 34A, 34B, 34C and 34D corresponding to engine cylinders 12A-12D, respectively. In an alternative embodiment illustrated in FIG. 4, intake runners 34B and 34C may diverge from a single runner 35 after passing through a single throttle body 58 to be described in further detail below. The combustion charge 32 is mixed with fuel in the cylinders 12 and is combusted therein. One or more ignition devices such as spark plugs 36 may be located in communication with the cylinders 12 and operate to ignite the fuel/air mixture therein.

In an exemplary embodiment, exhaust gas 38 from the combustion of fuel and combustion charge 32 in the working cylinders 12A and 12D (cylinders #1 and #4) exits the cylinders through the exhaust passages 40 of a first exhaust manifold 42. The exhaust manifold 42 is in fluid communication with an exhaust treatment system 44 that may include one or more exhaust treatment devices (ex. oxidation catalyst device, selective catalyst reduction device, particulate trap, or a combination thereof) 46 for the oxidation, reduction or filtering of exhaust constituents prior to the release of the exhaust gas to the atmosphere. Exhaust gas 48 from the combustion of fuel and combustion charge 32 in the EGR cylinders 12B and 12C (cylinders #2 and #3) exits the cylinders through the exhaust passages 50 of a second exhaust manifold 52. The exhaust manifold 52 is in fluid communication with EGR supply conduit 54 which delivers the exhaust gas as EGR 30 to the intake system 24. An EGR cooler 56 may be disposed within the EGR supply conduit 54 to cool the exhaust gas 48 prior to its reintroduction into the intake system as EGR 30 and mixing with the combustion air 18.

In an exemplary embodiment, the cylinder firing order of the internal combustion engine 10 may be working cylinder #1, 12A, EGR cylinder #3, 12C, working cylinder #4, 12D and EGR cylinder #2, 12B. As a result of this firing order, the cylinders supplying EGR 30 to the intake system 24 (i.e. cylinders 12B and 12C) fire between the combustion events of the working cylinders 12A and 12D thereby providing a consistent flow of EGR 30 to the intake system 24 and the combustion charge 32 thereby assuring constant delivery of EGR to the working cylinders 12A and 12D during operation of the internal combustion engine 10. The firing order described is for exemplary purposes and it is contemplated that other sequences will achieve the same result without deviating from the scope of the invention.

In an exemplary embodiment, the EGR cylinders 12B and 12C may comprise volumetric dimensions that differ from the working cylinders 12A ands 12D. Typically the volumetric dimensions may be smaller than those of the working cylinders. For example, in a 2.0 Liter, 4-cylinder internal combustion engine it is contemplated that the bore and stroke of the working cylinders may be in the range of 88.0 mm and 98.0 mm, respectively while the bore and stroke of the EGR cylinders may be in the range of 84.0 mm and 72.8 mm, respectively. The result is a displacement of the working cylinders in the range of about 1192 cc and a displacement of the EGR cylinders of about 806 cc.

Referring again to FIGS. 1 and 4, in exemplary embodiments, intake runners 34B and 34C of the intake manifold 34 (or 34' of FIG. 4) may include one or more throttle bodies 58 which may be electronically controlled by an engine or other controller (not shown). The electronically controlled throttle body, or bodies, 58 is/are in signal communication with a controller (not shown) that monitors various engine and exhaust system parameters and adjusts the flow of combustion charge into the EGR cylinders 12B and 12C to thereby adjust the composition of the combustion charge entering the EGR cylinders with the result that the exhaust gas 48 exiting the EGR cylinders is optimized for the working cylinders 12A and 12B. Additionally, the operation of the inlet and exhaust valves may utilize standard cam-on-shaft configurations or, in an exemplary embodiment, may use variable cam phasing such as cam-in-cam, two-step configurations on the inlet valves of the EGR cylinders 12B and 12C to allow for adjustment of the combustion charge entering those cylinders. Such adjustment is provided through signal communication with the controller (not shown) based on various measured engine and exhaust system parameters.

Figure 2:
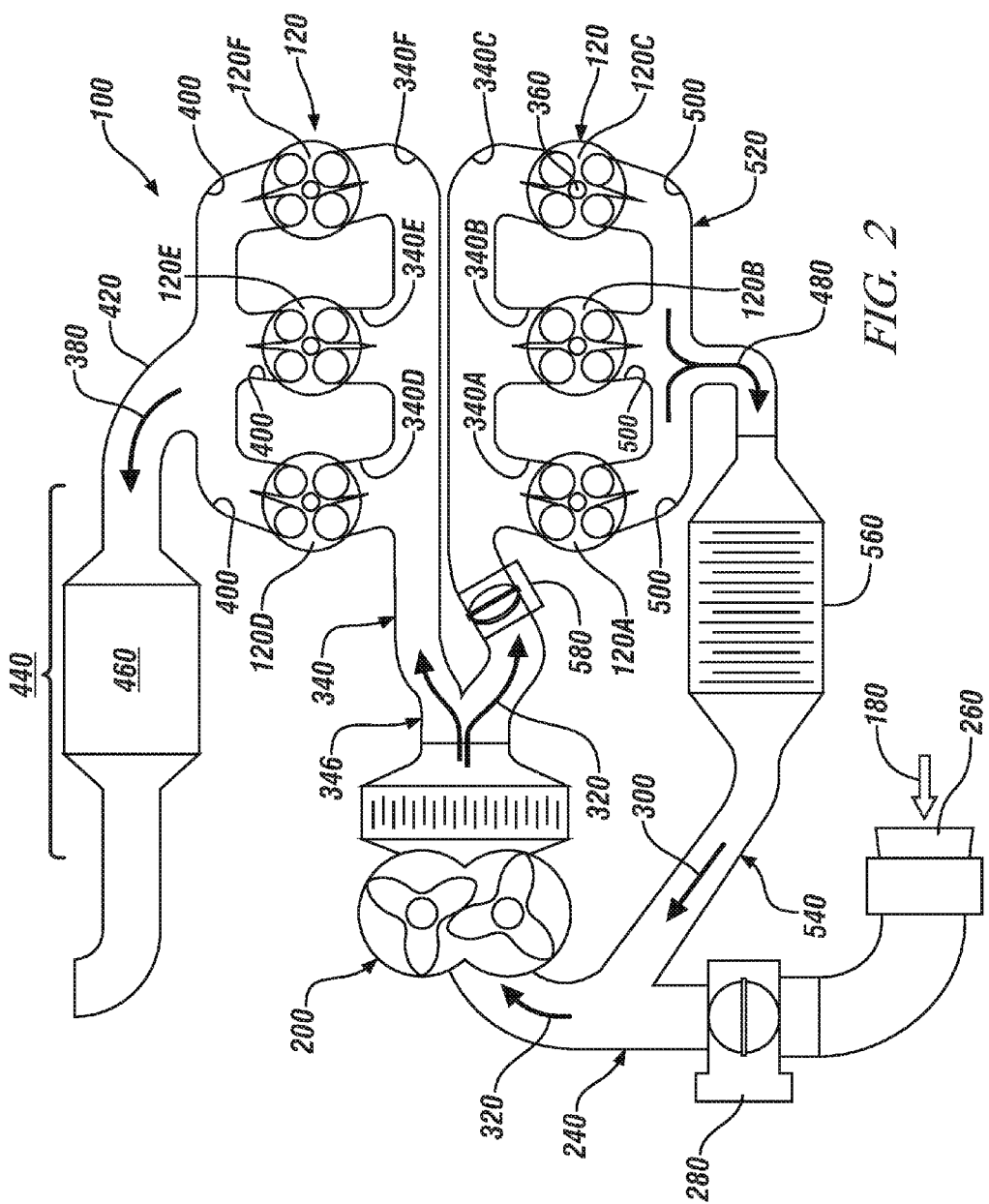
FIG. 2 is a schematic plan view of portions of another embodiment of an internal combustion engine system embodying features of the invention.

Referring to FIG. 2, another exemplary embodiment of the invention is directed to a V-configured 6-cylinder internal combustion engine system 100 comprising a plurality of engine cylinders 120 arrayed in two offset banks. Referring to the engine cylinders 120 in the embodiment shown, all six cylinders 120 are configured to operate on a four-stroke combustion cycle. The individual cylinders are numbered cylinder #1, 120A (EGR cylinder), cylinder #2, 120B (EGR cylinder), cylinder #3 120C (EGR cylinder), cylinder #4, 120D (working cylinder), cylinder #5, 120E (working cylinder), cylinder #6, 120F (working cylinder). Combustion air 180 enters an intake system 240 through inlet 260 and is metered by a throttle body 280 in a known manner. The metered combustion air 180 is mixed with an exhaust gas diluent referred to generally as recirculated exhaust gas or EGR 300 to form a combustion charge 320 comprising a mixture of combustion air 180 and EGR 300.

The combustion charge 320 may be compressed by a compressor 200, which in the exemplary embodiment shown is an engine driven supercharger, and is delivered to each of the engine cylinders 120 through an intake manifold 340 comprising a plurality of intake runners 340A, 340B, 340C, 340D, 340E and 340F corresponding to engine cylinders 120A-120F, respectively. The combustion charge 320 is mixed with fuel in the cylinders 120 and is combusted therein. One or more ignition devices such as spark plugs 360 may be located in communication with the cylinders 120 and operate to ignite the fuel/air mixture therein.

In an exemplary embodiment, exhaust gas 380 from the combustion of fuel and combustion charge 320 in the working cylinders 120D, 120E and 120F (cylinders #3, #4 and #5) exits the cylinders through the exhaust passages 400 of a first exhaust manifold 420. The exhaust manifold 420 is in fluid communication with an exhaust treatment system 440 that may include one or more exhaust treatment devices (ex. oxidation catalyst device, selective catalyst reduction device, particulate trap, or a combination thereof) 460 for the oxidation, reduction or filtering of exhaust constituents prior to the release of the exhaust gas to the atmosphere. Exhaust gas 480 from the combustion of fuel and combustion charge 320 in the EGR cylinders 120A, 120B and 12C (cylinders #1, #2 and #3) exits the cylinders through the exhaust passages 500 of a second exhaust manifold 520. The exhaust manifold 520 is in fluid communication with EGR supply conduit 540 which delivers the exhaust gas 480 as EGR 300 to the intake system 240. An EGR cooler 560 may be disposed within the EGR supply conduit 540 to cool the exhaust gas 480 prior to its reintroduction into the intake system 240 as EGR 300 for mixing with the combustion air 180.

In an exemplary embodiment, the cylinder firing order of the internal combustion engine 100 may be EGR cylinder #1, 120A, working cylinder #4, 120D, EGR cylinder #2, 120B, working cylinder #5, 120E, EGR cylinder #3, 120C and working cylinder #6, 120F. As a result of this firing order, the cylinders 120 supplying EGR 300 to the intake system 240 (i.e. cylinders 120A, 120B and 120C) fire between the combustion events of the working cylinders 120D, 120E and 120F thereby providing a consistent flow of EGR 300 to the intake system 240 and the combustion charge 320 thereby assuring consistent delivery of EGR to the working cylinders 120D, 120E and 120F during operation of the internal combustion engine 100. The firing order described is for exemplary purposes and it is contemplated that other sequences will achieve the same result without deviating from the scope of the invention. In an exemplary embodiment, the EGR cylinders 120A, 120B and 120C may comprise volumetric dimensions that differ from the working cylinders 120D, 120E and 120F. Typically the volumetric dimensions may be smaller than those of the working cylinders.

Referring again to FIG. 2, in an exemplary embodiment, intake runners 340A, 340B and 340C of the intake manifold 340 may be throttled by an electronically controlled throttle body 580. The electronically controlled throttle body 580 is in signal communication with a controller (not shown) that monitors various engine and exhaust system parameters and adjusts the flow of combustion charge 320 into the EGR cylinders 120A, 120B and 120C to thereby adjust the composition of the combustion charge entering the EGR cylinders with the result that the exhaust gas 480 exiting the EGR cylinders is optimized for the working cylinders 120D, 120E and 120F. Additionally, the operation of the inlet and exhaust valves may utilize standard cam-on-shaft configurations or, in an exemplary embodiment, may use variable cam phasing such as cam-in-cam, two-step configurations on the inlet valves of the EGR cylinders 120A, 120B and 120C to allow for adjustment of the combustion charge entering those cylinders. Such adjustment is provided through signal communication with the controller (not shown) based on various measured engine and exhaust system parameters.

Figure 3:
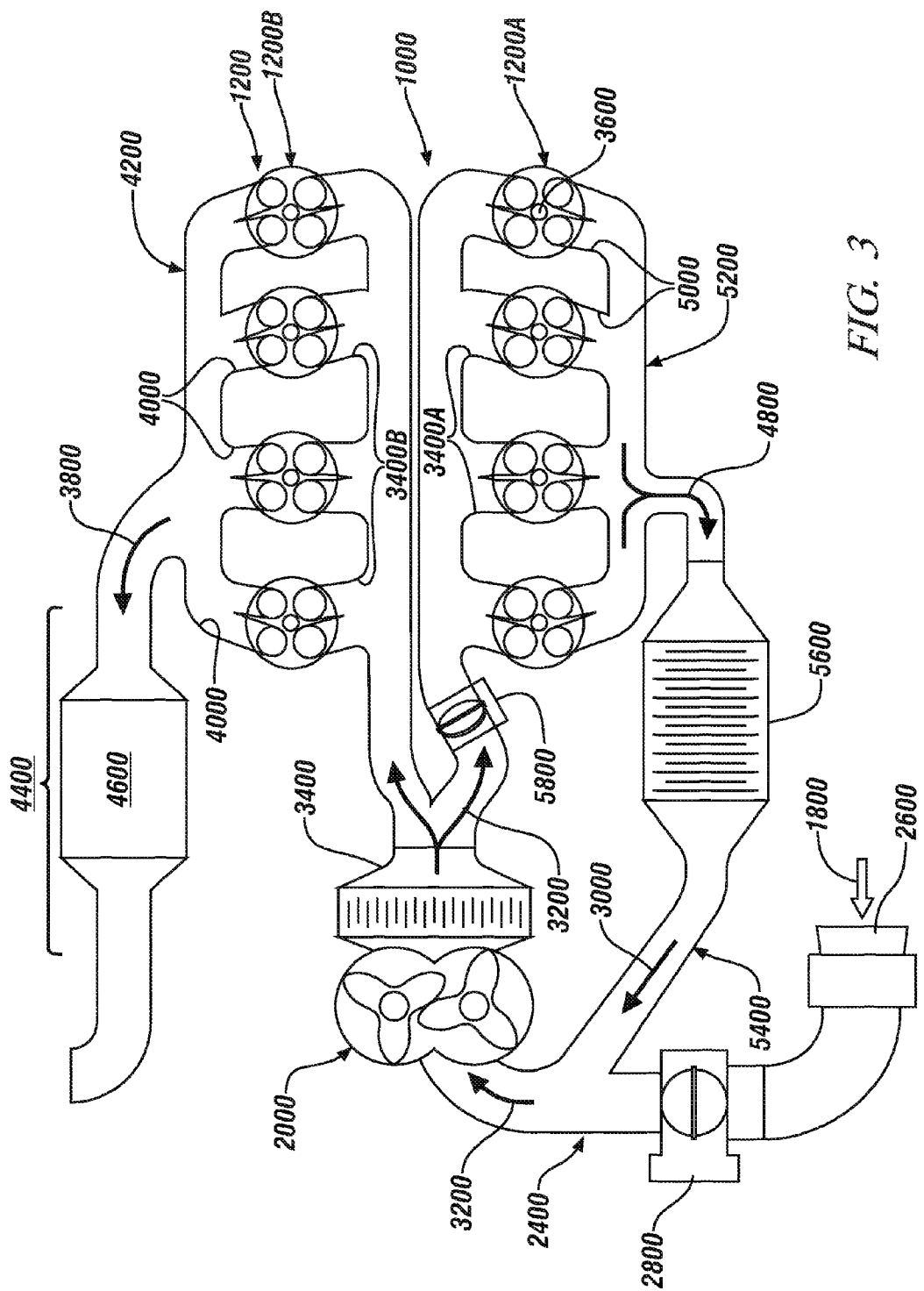
FIG. 3 is a schematic plan view of portions of yet another embodiment of an internal combustion engine system embodying features of the invention.

Referring to FIG. 3, another exemplary embodiment of the invention is directed to a V-configured 8-cylinder internal combustion engine system 1000 comprising a plurality of engine cylinders 1200 arrayed in two offset banks 1200A (EGR cylinders) and 1200B (working cylinders). Referring to the engine cylinders 1200 in the embodiment shown, all eight cylinders 1200 are configured to operate on a four-stroke combustion cycle. Combustion air 1800 enters an intake system 2400 through inlet 2600 and is metered by a throttle body 2800 in a known manner. The metered combustion air 1800 is mixed with an exhaust gas diluent referred to generally as recirculated exhaust gas or EGR 3000 to form a combustion charge 3200 comprising a mixture of combustion air 1800 and EGR 3000.

The combustion charge 3200 may be compressed by a compressor 2000 which, in the exemplary embodiment shown, is an engine driven supercharger and is delivered to each of the engine cylinders 1200 through an intake manifold 3400 comprising a plurality of intake runners 3400A and 3400B corresponding to engine cylinder banks 1200A and 1200B, respectively. The combustion charge 3200 is mixed with fuel in the cylinders 1200 and is combusted therein. One or more ignition devices such as spark plugs 3600 may be located in communication with the cylinders 1200 and operate to ignite the fuel/air mixture therein.

In an exemplary embodiment, exhaust gas 3800 from the combustion of fuel and combustion charge 3200 in the working cylinders 1200 of working cylinder bank 1200B exits the cylinders through the exhaust passages 4000 of a first exhaust manifold 4200. The exhaust manifold 4200 is in fluid communication with an exhaust treatment system 4400 that may include one or more exhaust treatment devices (ex. oxidation catalyst device, selective catalyst reduction device, particulate trap, or a combination thereof) 4600 for the oxidation, reduction or filtering of exhaust constituents prior to the release of the exhaust gas to the atmosphere. Exhaust gas 4800 from the combustion of fuel and combustion charge 3200 in the EGR cylinders 1200 of the EGR cylinder bank 1200A exits the cylinders through the exhaust passages 5000 of a second exhaust manifold 5200. The exhaust manifold 5200 is in fluid communication with EGR supply conduit 5400 which delivers the exhaust gas 4800 as EGR 3000 to the intake system 2400. An EGR cooler 5600 may be disposed within the EGR supply conduit 5400 to cool the exhaust gas 4800 prior to its reintroduction into the intake system 2400 as EGR 3000 for mixing with the combustion air 1800.

In an exemplary embodiment, the cylinder firing order of the internal combustion engine 1000 is selected such that the cylinders 1200 supplying EGR 3000 to the intake system 2400 (i.e. EGR cylinder bank 1200A) fire between the combustion events of the working cylinders of cylinder bank 1200B, thereby providing a consistent flow of EGR 3000 to the intake system 2400 and the combustion charge 3200 to assure consistent delivery of EGR to the cylinders of working cylinder bank 1200B during operation of the internal combustion engine 1000. In an exemplary embodiment, the cylinders of EGR bank 1200A may comprise volumetric dimensions that differ from the cylinders of the working bank 1200B. Typically the volumetric dimensions may be smaller than those of the working cylinders.

Referring again to FIG. 3, in an exemplary embodiment, intake runners 3400A of the intake manifold 3400 may be throttled by a throttle body 5800. The throttle body 5800 may be electronically controlled and in signal communication with a controller (not shown) that monitors various engine and exhaust system parameters and adjusts the flow of combustion charge 3200 into the bank of EGR cylinders 1200A to thereby adjust the composition of the combustion charge 3200 entering the EGR cylinders with the result that the exhaust gas 4800 exiting the bank of EGR cylinders 1200A is optimized for the bank of working cylinders 1200B. Additionally, the operation of the inlet and exhaust valves may utilize standard cam-on-shaft configurations or, in an exemplary embodiment, may use variable cam phasing such as cam-in-cam, two-step configurations on the inlet valves of the EGR cylinders to allow for adjustment of the combustion charge entering those cylinders. Such adjustment is provided through signal communication with the controller (not shown) based on various measured engine and exhaust system parameters.

The invention has been described in various embodiments that illustrate its applicability to several different engine configurations. It is, of course, contemplated that the invention has applicability to virtually any engine configuration in which an equal number of EGR cylinders supply EGR to the intake system of the engine and subsequently to an equal number of working cylinders. The result is a consistent flow of EGR to the working cylinders and improved engine performance. Is should also be noted that while cylinders have been designated as working cylinders and EGR cylinders, both types of cylinders are producing work and delivering it to the engine crankshaft. The focus of the EGR cylinders being the provision of EGR with appropriate constituent levels that may affect the level of work produced by the EGR cylinders as a result.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. An inline 4-cylinder internal combustion engine comprising:
    two four stroke working cylinders;
    two four stroke EGR cylinders;
    an intake system configured for supplying a combustion air charge to the four stroke working cylinders and the four stroke EGR cylinders;
    a first exhaust system configured for removing exhaust gas from the four stroke working cylinders and delivering the exhaust gas from the four stroke working cylinders to the atmosphere; and
    a second exhaust system configured for removing exhaust from the four stroke EGR cylinders and delivering the exhaust to the intake system, such that the combustion air charge comprises the exhaust gas from the four stroke EGR cylinders;
    wherein cylinders 1 and 4 are configured as four stroke working cylinders and cylinders 2 and 3 are configured as four stroke EGR cylinders;
    the engine having a cylinder firing order of 1, 3, 4, 2.

2. An inline 4-cylinder internal combustion engine comprising:
    two four stroke working cylinders configured for producing a flow of working cylinder exhaust gas;
    two four stroke EGR cylinders configured for producing only a flow of EGR cylinder exhaust gas;
    an intake system configured for supplying a combustion air charge to the four stroke working cylinders and the four stroke EGR cylinders;
    a first exhaust system configured for removing the flow of working cylinder exhaust gas from the four stroke working cylinders and delivering the flow of working cylinder exhaust gas to the atmosphere; and
    a second exhaust system configured for removing all of the flow of EGR cylinder exhaust gas from the four stroke EGR cylinders and delivering said all of the flow of EGR cylinder exhaust gas to the intake system, such that the combustion air charge comprises said all of the flow of EGR cylinder exhaust gas from the four stroke EGR cylinders and such that said all of the flow of EGR cylinder exhaust gas from the four stroke EGR cylinders passes through one or more of the four stroke working cylinders when the one or more of the four stroke working cylinders are being fired before being delivered to the atmosphere via the first exhaust system;
    wherein cylinders 1 and 4 are configured as four stroke working cylinders and cylinders 2 and 3 are configured as four stroke EGR cylinders.

3. The internal combustion engine of claim 2, wherein the four stroke EGR cylinders have a different volume than the four stroke working cylinders.

4. The internal combustion engine of claim 3, wherein the four stroke EGR cylinders have a smaller volume than the four stroke working cylinders.

5. The internal combustion engine of claim 2, further comprising a throttle body disposed in the intake system to meter the combustion air charge entering the four stroke EGR cylinders.

6. The internal combustion engine of claim 2, further comprising an engine driven supercharger disposed in the intake system and configured to compress the combustion air charge and deliver it to the four stroke working cylinders and the four stroke EGR cylinders.

7. The internal combustion engine of claim 2, wherein the cylinders have a firing order such that combustion events of the four stroke EGR cylinders occur between combustion events of the four stroke working cylinders delivering a consistent flow of exhaust gas to the intake system and constant delivery of recirculated exhaust gas to the four stroke working cylinders during operation of the internal combustion engine.

8. A V-configured 6-cylinder internal combustion engine comprising:
    three four stroke working cylinders configured for producing a flow of working cylinder exhaust gas;
    three four stroke EGR cylinders configured for producing only a flow of EGR cylinder exhaust gas;

an intake system configured for supplying a combustion air charge to the four stroke working cylinders and the four stroke EGR cylinders;

a first exhaust system configured for removing the flow of working cylinder exhaust gas from the four stroke working cylinders and delivering the flow of working cylinder exhaust gas to the atmosphere; and a second exhaust system configured for removing all of the flow of EGR cylinder exhaust gas from the four stroke EGR cylinders and delivering said all of the flow of EGR cylinder exhaust gas to the intake system, such that the combustion air charge comprises said all of the flow of EGR cylinder exhaust gas from the four stroke EGR cylinders and such that said all of the flow of EGR cylinder exhaust gas from the four stroke EGR cylinders passes through one or more of the four stroke working cylinders when the one or more of the four stroke working cylinders are being fired before being delivered to the atmosphere via the first exhaust system;

wherein cylinders 1, 2 and 3 are configured as four stroke EGR cylinders and cylinders 4, 5 and 6 are configured as four stroke working cylinders.

9. The internal combustion engine of claim 8, wherein the four stroke EGR cylinders have different volumes than the four stroke working cylinders.

10. The internal combustion engine of claim 8, wherein the four stroke EGR cylinders have a smaller volume than the four stroke working cylinders.

11. The internal combustion engine of claim 8, further comprising at least one throttle body disposed in the intake system to meter the combustion air charge entering the four stroke EGR cylinders.

12. The internal combustion engine of claim 8, further comprising an engine driven supercharger disposed in the intake system and configured to compress the combustion air charge and deliver it to the four stroke working cylinders and the four stroke EGR cylinders.

13. The internal combustion engine of claim 8, wherein the cylinders have a firing order such that combustion events of the four stroke EGR cylinders are between combustion events of the four stroke working cylinders delivering a consistent flow of exhaust gas to the intake system and constant delivery of recirculated exhaust gas to the four stroke working cylinders during operation of the internal combustion engine.

14. A V-configured 8-cylinder internal combustion engine comprising:

four four stroke working cylinders configured for producing a flow of working cylinder exhaust gas;

four four stroke EGR cylinders configured for producing only a flow of EGR cylinder exhaust gas;

an intake system configured for supplying a combustion air charge to the cylinders;

a first exhaust system configured for removing the flow of working cylinder exhaust gas from the four stroke working cylinders and delivering the flow of working cylinder exhaust gas to the atmosphere;

a second exhaust system configured for removing all of the flow of EGR cylinder exhaust gas from the four stroke EGR cylinders and delivering said all of the flow of EGR cylinder exhaust gas to the intake system, such that the combustion air charge comprises said all of the flow of EGR cylinder exhaust gas from the four stroke EGR cylinders and such that said all of the flow of EGR cylinder exhaust gas from the four stroke EGR cylinders passes through one or more of the four stroke working cylinders when the one or more of the four stroke working cylinders are fired before being delivered to the atmosphere via the first exhaust system;

wherein cylinders 1, 2, 3 and 4 configured as four stroke EGR cylinders and cylinders 5, 6, 7 and 8 are configured as four stroke working cylinders.

15. The internal combustion engine of claim 14, wherein the four stroke EGR cylinders have different volumes than the four stroke working cylinders.

16. The internal combustion engine of claim 15, wherein the four stroke EGR cylinders have a smaller volume than the four stroke working cylinders.

17. The internal combustion engine of claim 14, further comprising at least one throttle body disposed in the intake system to meter the combustion air charge entering the four stroke EGR cylinders.

18. The internal combustion engine of claim 14, further comprising an engine driven supercharger disposed in the intake system and configured to compress the combustion air charge and deliver it to the four stroke working cylinders and the four stroke EGR cylinders.

19. The internal combustion engine of claim 14, wherein the cylinders have a firing order such that combustion events of the four stroke EGR cylinders are between combustion events of the four stroke working cylinders delivering a consistent flow of exhaust gas to the intake system and constant delivery of recirculated exhaust gas to the four stroke working cylinders during operation of the internal combustion engine.

* * * * *